United States Patent [19]

Donohue et al.

[11] 4,165,170

[45] Aug. 21, 1979

[54] CONTROL SYSTEM

[75] Inventors: James M. Donohue, Los Alamitos, Calif.; Daniel L. Mueller, Fairport, N.Y.

[73] Assignee: Xerox Corporation, Stamford, Conn.

[21] Appl. No.: 561,467

[22] Filed: Mar. 24, 1975

Related U.S. Application Data

[60] Division of Ser. No. 438,972, Feb. 4, 1974, Pat. No. 3,917,396, which is a continuation-in-part of Ser. No. 244,734, Apr. 12, 1972, Pat. No. 3,796,486, which is a continuation of Ser. No. 97,745, Dec. 14, 1970, abandoned.

[51] Int. Cl.$^2$ .................................. G03G 15/00
[52] U.S. Cl. .......................................... 355/14
[58] Field of Search .................. 355/14; 307/141, 220, 307/293; 328/48, 49, 72, 75, 130; 340/309.1, 309.4; 235/92 CT, 92 T, 92 SH

[56] References Cited

U.S. PATENT DOCUMENTS

| | | |
|---|---|---|
| 3,301,126 | 1/1967 | Osborne et al. .................. 355/14 |
| 3,355,983 | 12/1967 | Bogart et al. .................... 355/14 |
| 3,372,627 | 3/1968 | Murray et al. ................... 355/14 |
| 3,416,860 | 12/1968 | Mihojevich et al. ............. 355/14 |
| 3,732,005 | 5/1973 | Lloyd ............................... 355/14 |
| 3,741,640 | 6/1973 | Hickey et al. ................ 355/14 X |
| 3,909,128 | 9/1975 | Sohm ........................... 355/14 X |

Primary Examiner—L. T. Hix
Assistant Examiner—W. J. Brady

[57] ABSTRACT

A control system for controlling the processing steps of an electrostatic printing machine including means for generating a series train of clock pulses, means for generating a series train of start or reset pulses and control logic responsive to the reset and clock pulses to generate a plurality of timed control signals for implementing certain of the processing steps. A transfer roller, the linear surface speed of which is synchronized with the moving speed of the photoreceptor, may be used to generate the reset pulses for the successive cycle of processing operation. The intervals between the successive reset pulses, called pitches, are in effect marked by the clock pulses, some of which are used to generate the timed control signals.

1 Claim, 5 Drawing Figures

CONTROL SYSTEM

This is a divisional application of a copending U.S. patent application, Ser. No. 438,972, now U.S. Pat. No. 3,917,396 issued Nov. 4, 1975. The copending application was, in turn, a continuation-in-part of application, Ser. No. 244,734, filed on Apr. 12, 1972 which issued as U.S. Pat. 3,796,486 on Mar. 12, 1974. U.S. patent application, Ser. No. 244,734 was, in turn, a continuation of U.S. patent application, Ser. No. 97,745, filed on Dec. 14, 1970, now abandoned.

This invention relates to a control system for processing machines and, particularly, to an improved control system for electrostatic reproducing machines.

Electrostatic printing machines of the endless belt type employ various processing stations that uniformly charge, expose, develop, transfer, clean, etc. during any cycle of copying. For high speed operation of these machines, it becomes very important that there be a proper base for the timing sequence of operation of the processing stations in order to maintain proper registration of the processing functions relative to images. In controlling the operation of the machine, there must be provisions for efficient and reliable movement of sheets of copy paper along the paper path of the machine and in particular for timely presentation of the sheets in succession to the transfer station of the machine in timed sequence relative to the production of electrostatic latent images for the proper orientation of each sheet of the developed image received at the transfer station, and for assuring timely removal of each sheet at a precise time in order to effect continued movement of each sheet for further processing thereof, and for reliable means to detect jam conditions.

Likewise, there must be provisions for efficient and reliable movement of photoconductor belt or medium past various electrostatographic processing stations such as charging, exposing, developing and transferring stations and controlling the actuation of certain of these stations in a timely manner so that when a developed image is presented for transfer to the paper sheet, it is properly registered.

Therefore, the principal object of the present invention is to provide an improved control means for processing machines in general and, in particular, provide an improved control means for electrostatographic reproducing machines.

Another object of the present invention is to maintain proper timing of the operation of the electrostatographic processing stations in the machine so as to effect maximum efficiency in the operation of the machines, especially of the type designed for high speed reproduction.

Yet another object of the present invention is to improve the throughput capacity of the machine.

Still another object of the present invention is to render the machine more versatile, flexible and reliable.

In accordance with the present invention, the foregoing objects of the invention are attained by a control system having means for providing a series train of clock pulses, means for generating reset or start pulses in succession for each of the processing cycles, and logic means for generating a plurality of timed control signals derived from the start and clock pulses for enabling various processing stations to implement the machine processing steps timely.

In accordance with a feature of the present invention, the timed sequence of control signals for operating certain processing stations is based upon start or reset pulses keyed to the displacement of position of the photoreceptor belt or medium which is sensed by a speed responsive element preferably in the form of the transfer roller used for transferring the image to the copy sheet.

According to yet another feature of the invention, the control system is adapted to generate more than one cycle of enabling pulses to process more than one copying process in the machine at any given moment. The foregoing and other objects and features will become apparent from the following detailed description of illustrative embodiments of the present invention in conjunction with the accompanying drawings, in which:

DETAILED DESCRIPTION

Basic principles and features of the control system according to the present invention will be described principally in terms of operating a xerographic machine, such as the one schematically illustrated in FIG. 1. But it is to be understood clearly from the outset that the nature and the scope of the present invention is not intended to be limited to the operation of xerographic copying machines. It is not only applicable to other types of reproducing machines but also more broadly to any types of processing machines or systems requiring control means. A xerographic machine is used merely for the purpose of facilitating one's understanding of the principles and features of the present invention and is not intended to limit the scope of the present invention to the xerographic copier/duplicator technology.

Figure 1:
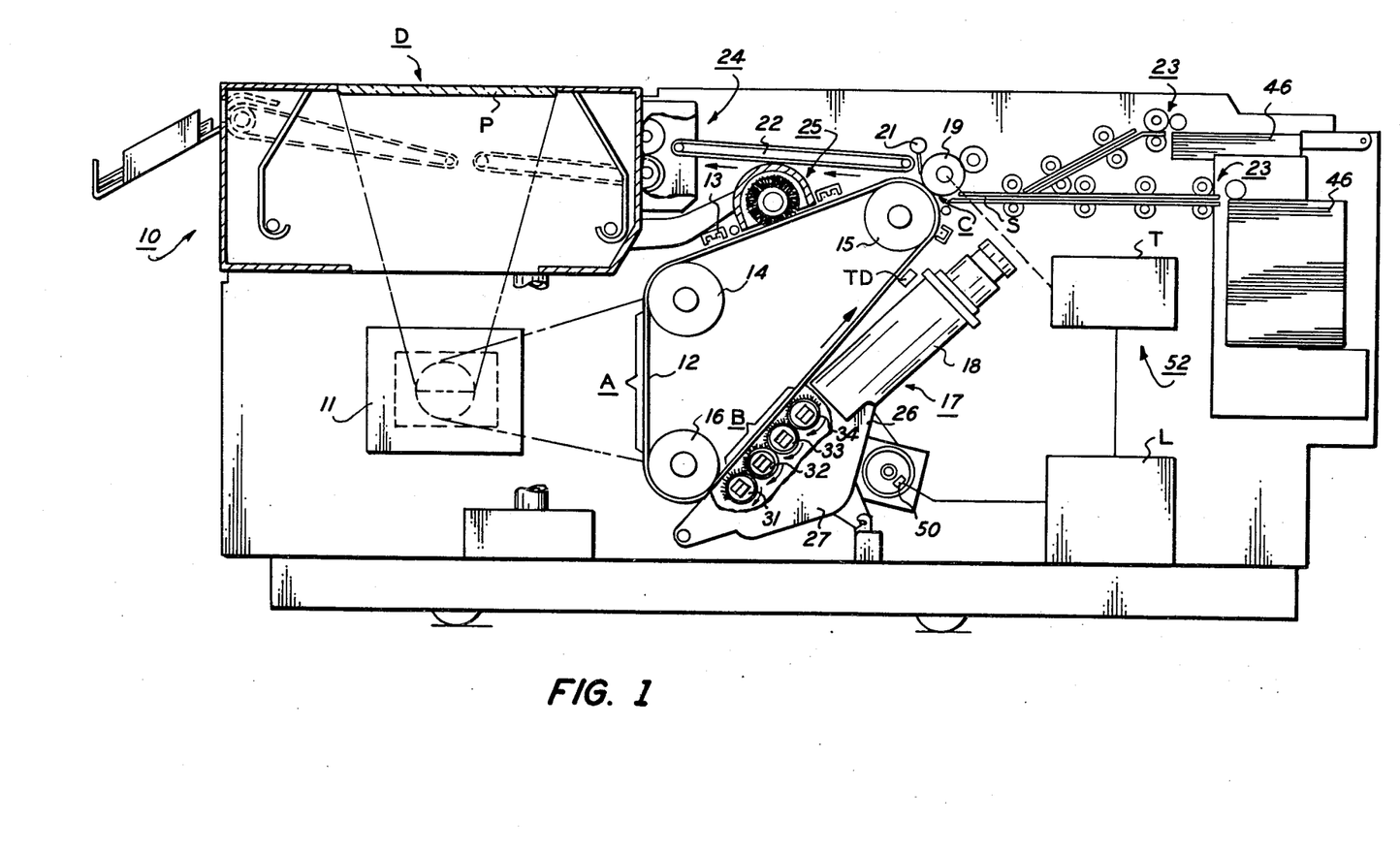
FIG. 1 shows a schematic sectional view of an electrostatic reproduction machine embodying the principles of the invention.

Now for a general understanding of an electrostatic processing system, in which the invention may be incorporated, reference is had to FIG. 1 in which various components of a xerographic reproducing system are schematically illustrated. As in all xerographic reproducing systems of the type illustrated, a light image of an original to be reproduced is projected onto the sensitized surface of a xerographic plate to form an electrostatic latent image thereon. Thereafter, the latent image is developed with an oppositely charged developing material comprising carrier beads and smaller toner particles triboelectrically adhering thereto to form a xerographic powder image, corresponding to the latent image on the plate surface. The powder image is then electrostatically transferred to a support surface to which it may be fixed by a fusing device whereby the powder image is caused permanently to adhere to the support surface.

The electrostatically attractable developing material commonly used in magnetic brush developing apparatus comprises a pigmented resinous powder referred to here as "toner" and a "carrier" of larger granular beads formed with steel cores coated with a material removed in the triboelectric series from the toner so that a triboelectric charge is generated between the toner powder and the granular carrier. The magnetizable carrier also provides mechanical control for the formation of brush bristles by virtue of magnetic fields so that the toner can be readily handled and brought into contact with the exposed xerographic surface. The toner is then attracted to the electrostatic latent image from the carrier bristles to produce a visible powder image on an insulating surface.

In the illustrated machine, an original D to be copied is placed upon a transparent support platen P fixedly arranged in an illumination assembly generally indicated by the reference numeral 11. While upon the platen, an illumination system flashes light rays upon the original thereby producing image rays corresponding to the informational areas on the original. The image rays are projected by means of an optical system 11 to an exposure station A for exposing the photosensitive surface of a moving xerographic plate in the form of a flexible photoconductive belt 12. In moving in the direction indicated by the arrow, prior to reaching the exposure station A, that portion of the belt being exposed would have been uniformly charged by a corona device 13 located at a belt run extending between belt supporting rollers 14 and 15. The exposure station extends between the roller 14 and a third support roller 16, and the belt run between these rollers is encompassed entirely by the exposure station for minimizing the space needed for the belt and its supporting rollers.

The exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes around the roller 16 and through a developing station B located at a third run of the belt and in which there is positioned a developing apparatus generally indicated by the reference numeral 17. Suitable means (not shown) such as, vacuum panels or tensioning means, may be utilized for maintaining the belt flat in all three belt runs, and additionally the belt run related to the development zone B is maintained at an inclined plane. The developing apparatus 17 comprises a plurality of magnetic brushes which carry developing material to the adjacent surface of the upwardly moving inclined photoconductive belt 12 in order to provide development of the electrostatic image.

As the developing material is applied to the xerographic belt, toner particles in the development material are attracted electrostatically to the belt surface to form powder images. As toner powder images are formed, additional toner particles are supplied to the developing material in proportion to the amount of toner deposited on the belt during xerographic processing. For this purpose, a toner dispenser generally indicated by reference numeral 18 is used to accurately meter toner, upon demand, to the developer material in the developing apparatus 17.

The developed electrostatic image is transported by the belt 12 to a transfer station C located at a point of tangency on the belt as it moves around the roller 15 whereat a sheet of copy paper is moved at a speed in synchronism with the moving belt in order to accomplish transfer of the developer image. There is provided at this station a transfer roller 19 which is arranged on the frame of the machine for contacting the non-transfer side of each sheet of copy paper as the same is brought into transfer engagement with the belt 12. The roller 19 is electrically biased with sufficient voltage so that a developed image on the belt 12 may be electrostatically transferred to the adjacent side of a sheet of paper S, as the same is brought into contact therewith, and also for tacking the same on the roller 19.

A stripping finger or air puffing device 21 utilized for stripping the sheet from the roller is provided to permit pickup and continued movement of the sheet by a vacuum conveying system 22. Each sheet of paper travels only a short distance before being stripped therefrom by the stripper 21. Devices such as gripper bars and release elements mounted on the roller 19 may be utilized instead of the stripper 21 for gripping the leading edge of each sheet of copy paper to ensure proper positioning thereon and to effect the release of a copy sheet at a precise time so as to strip the same for pickup by a conveying system. The timing of the release of each edge relative to the sheet separation from the supply stack of sheets may be for the same period of time.

Figure 2:
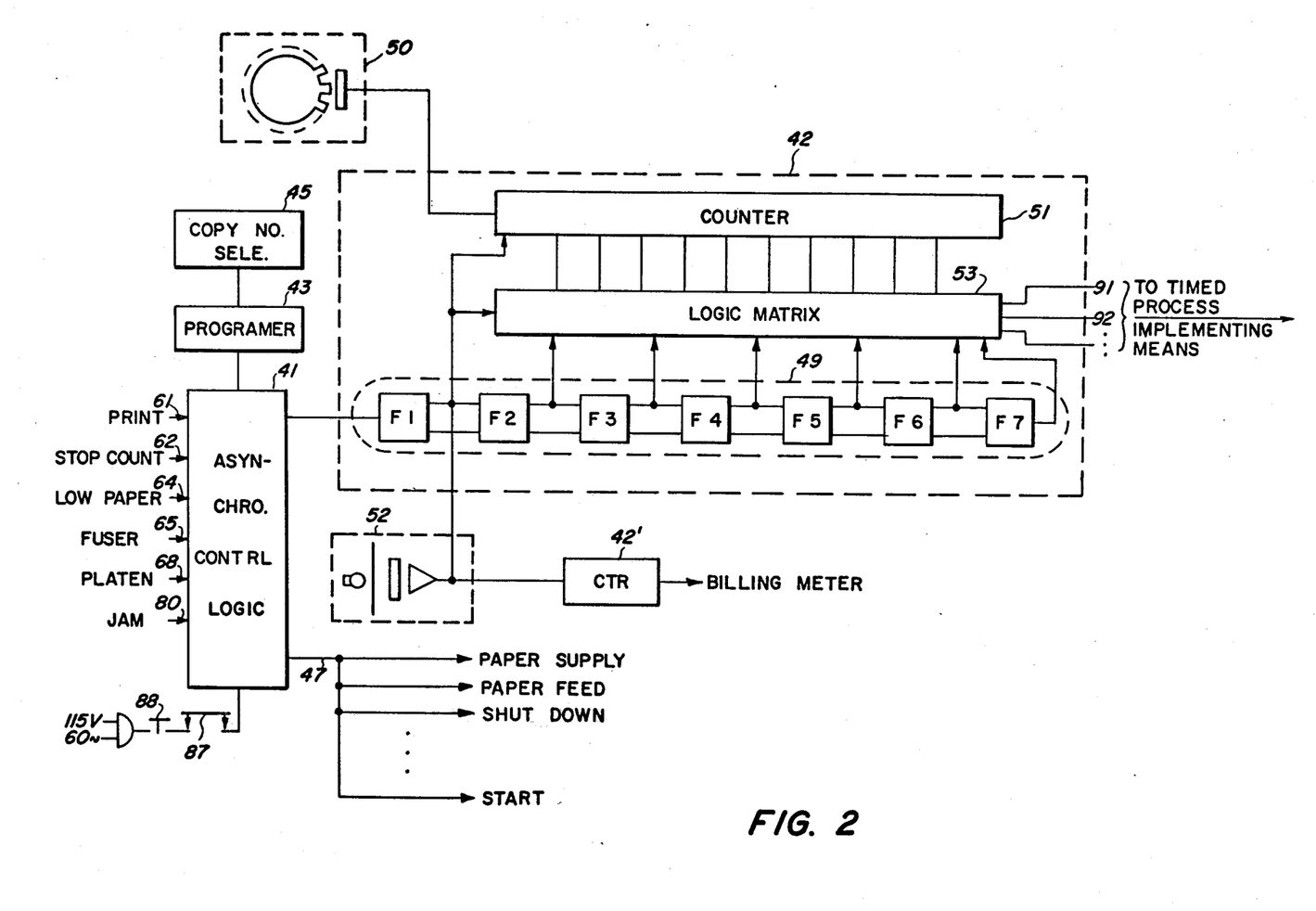
FIG. 2 shows an illustrative example of a control system according to the present invention.

There is also provided a suitable sheet transport mechanism adapted to transport sheets of paper seriatim from a paper handling mechanism generally indicated by the reference numeral 23 to the developed image on the belt being carried around the roller 15. The developed image on the belt 12, presented at the transfer station C in timed sequence and in registration with the arrival of a sheet of paper, is transferred to the sheet. The sheet is then stripped and forwarded toward the fusing station. Since the belt 12 may slip on its supporting rollers during high speed use, or the belt may have an undesirable transverse seam, it is preferred that the registration be directly related to the belt. This is accomplished by utilizing the transfer roller 19 which is directly applied to the belt and moves at all times directly therewith. A resetting mechanism is operatively coupled with the roller so that it resets for each revolution of the roller. The diameter of the roller 19 may be dimensioned so as to be slightly greater than the width of a sheet of paper being applied thereto in order to provide for the sheet width and desired spacing between sheets. The application of each sheet to the roller at precisely the same position for all sheets, may be utilized as the point or start, reset, or zero time for timing of each copying cycle. If another diameter is utilized for the roller 19, the circumference must be factored into image length so that reset is accomplished in the space equal to the width of a sheet of copy paper plus a little spacing distance between sheets. Control (FIG. 1: L; FIG. 2), as will be explained more fully below in generating flashing signals so the imaging means 11 form latent images on the belt at the imaging station A in successive sequence in timed relation to the start or reset pulses. Since the photoreceptor belt 12 is continuously being exposed by flashing imaging rays, it may contain a number of electrostatic latent images, for example, five images between the exposure and transfer stations.

Similarly, the paper path between the paper feeding apparatus 23 and the transfer station may contain two or more sheets. Any number of process cycles are put into control L and resister timing means operably coupled to the roller 19 concurrently at any given moment once the machine is initialized. Starting from zero on reset time, the stripper 21 may be activated to detach the leading edge of a sheet of paper from the roller 19, this sheet having been previously separated from the paper supply stack and advanced to the transfer station. The next operation in time may involve a flash exposure of the belt at the exposure station. The developed image being transferred commencing at the zero time of the present cycle may have had its exposure some five timing cycles previously. As the present timing cycle continues, the stripping device 21 may be activated again so as to strip the leading edge of another sheet away from the roller 19. As this roller continues to rotate it provides succession of reset pulses to the timing device T.

After the sheet is stripped from the belt 12, it is conveyed by the conveying system 22 into a fuser assembly generally indicated by the reference numeral 24 wherein the developed and transferred xerographic powder image on the sheet material is permanently affixed thereto. After fusing, the finished copy is discharged from the apparatus at a suitable point for collection externally of the apparatus.

The remaining toner particles remaining as residue on the developed images, background particles and those particles otherwise not transferred are carried by the belt 12 to a cleaning apparatus 25 positioned on the run of the belt between the rollers 14, 15 adjacent the charging device 13. The cleaning device comprises a rotating brush, a corotron for neutralizing charges remaining on the particles and discharge lamp for discharging any remaining electrostatic charges on the belt. It will be appreciated that the run of the belt adjacent the cleaning device is at an inclined angle relative to the horizontal as this run leaves the uppermost roller 15 where a developed image is transferred. Such an arrangement maintains the relatively straight line of copy sheet movement which operatively cooperates with the belt 12 at its highest point. The belt is then uniformly charged again at the charging station 13 for subsequent operations of exposure, development, etc.

Now the control system for the electrostatic printing machine described above in conjunction with FIG. 1 will be described in detail in conjunction with FIGS. 2, 3 and 4. But before the system is described, it will be helpful to review briefly prior art control systems for processing machines such as xerographic reproducing machines. Heretofore, the control systems have relied on mechanical or electromechanical control means largely in running its operation. With the advances in electronic technology, more recently, there has been a trend in the industry to use more of electronic control logic circuitry in controlling the machine operations. However, so far the conversion process has tended to be mere substitution of mechanical or electromechanical elements with functionally corresponding electronic logic elements. Thus, for example, typically, in the older machines for deriving timing signals of the operation of various process steps such as charging, imaging, developing, transferring and fusing, etc. a bank of cams integrally mounted on the drive shaft of the machine or apertured discs axially mounted on the shaft that chops a light source and photodetecting means that detects the chopped light, were used. Thus, according to the prior art, in deriving the control signals, the control system relied on the machine drive mechanism and slaved the timing of the control signals to the mechanical limitations of the drive mechanism itself and its rotational speed. This is adequate to run a simple processing system with a single process path requiring a drive motor and a relatively simple set of processing steps. But where more than one process path is involved and/or where any number of process steps must be decontrolled, the prior art scheme has become inadequate unwieldly and unreliable. The inadequacy gets all the more serious where some of the process paths or parts thereof are asynchronous. The inadequacy gets quite acute when the throughput capacity is increased significantly and some of the process steps take different time durations than others and some steps require precise timing whereas others do not, as is the case with high speed copier/duplicator machines, an example of which is described above in conjunction with FIG. 1.

Now a control system that avoids or overcomes much of the above mentioned and other shortcomings of the prior art will be described with reference to an illustrative embodiment shown in FIG. 2. As illustrated, the control system may comprise two main functional sections; an asynchronous section 41 and a synchronous section 42. The asynchronous section is designed to respond to various input signals of the type that will be described and generate control signals necessary to start, run and shut down the machine process. The synchronous logic section 42 is designed to generate control signals which must be precisely timed so that they implement the processing steps that require precise timing.

Referring to the first section, it includes an asynchronous or untimed control logic 41 of a suitable conventional design which provides the control signals necessary for the machine to start when a set of predetermined conditions are met or in proper states, shuts the machine down when an undesired condition is encountered or when a programmer 43 that programs copy runs (i.e., number of copies, mode of copy collation, etc.) indicates that the count of the copies made and indicated by a counter 42 equals the desired number of copies dialed in or programmed by a copy number selector 45.

The logic 41 is of a design that also provides control signals that are necessary to condition the machine so that the paper can be fed, transported, and processed and that are necessary to condition certain of the xerographic processing stations so that they are ready to operate.

The initial conditioning steps may also include housekeeping chores such as getting the fusing station heated up to an operating temperature, checking whether or not there is enough paper supply, getting the paper station (FIG. 1, 46) ready to feed the paper sheets into the paper path, etc. These initializing and housekeeping signals are provided via suitable output path 47 to the corresponding processing or implementing stations (not shown).

When the initializing conditions are met the asynchronous or untimed control section 41 initiates the copy run when the print button 61 is pushed. The initializing conditions may be a set of inputs signifying readiness of the machine such as the fact that the paper is not at a low supply condition (64), that the machine is in the standby mode, that the fuser is up to the temperature (65), that the platen cover is down to a proper position (68), and that the jam condition (80) do not exist. The asynchronous control logic section 41 operates asynchronously with the xerographic processing steps because the aforementioned types of initializing conditions or housekeeping chores signifying the readiness of the machine need not be in synchronism with the machine operation. Hence the logic 41 need not be synchronous with the rest of machine operation. It could be synchronous with the rest of the machine process, if the particular processing system or machine is of such a nature and the initializing and housekeeping chores must be performed synchronously with the process steps.

The asynchronous control section 41 produces the necessary control signals to start the machine and run it with the help of timed control signals from the logic section 42. It also generates a stop print signal from the programmer 43 when the copy run is complete at which point it initiates the shutdown cycle. The shutdown cycle entails the steps of processing out the remaining images in the paper path and the xerographic processing path. After this the control 41 reverts the machine to the standby mode.

In response to the emergency conditions, such as low paper supply or platen disengagement, logic 41 initiates the shutdown cycle. The asynchronous logic 41 may be of such design that, in the presence of a jam signal (80), it will shut down the affected portion of the machine immediately in order to prevent damage to the machine by the jammed sheet of paper. In the presence of a condition that requires an immediate shutdown of the entire machine, it will bring the entire machine to a "hard" or abrupt stop. Thus, in the case of a jam occurring as a copy sheet is about to reach the fuser station 24 (FIG. 1), it will stop the machine immediately to prevent feeding of the sheet into the fusing station. Suitable interlocking means 87 may be operatively connected in series with a power on/off switch 88 as a safety measure.

The second section includes synchronous or timed logic 42 having a shift register 49, a counter 51, and a logic matrix 53 operatively connected to provide a plurality of precisely timed control signals for actuating or implementing the various machine processing steps that require precisely timed operation in their successive cycles of operation.

Referring to FIG. 1, the events or processing steps that require the precise timing in the process are steps such as the flashing of the light to form an electrostatic image on the imaging station A and transferring the image to the copy sheet S at the transferring station C by the transfer roller 19, in the xerographic process. In the paper path, the paper sheet must be registered or presented; that is, it must arrive at the transfer roller at a right moment so that the image being transferred is properly centered in the copy sheet. Other signals that may require precise timing may be the monitoring functions, such as jam detection signals along the paper path so that they are monitored at the right time in the process cycles.

The control system described broadly above is similar in the functional sense to those of the prior art machine in that it provides a plurality of enabling control signals for implementing their known processing steps. However, the present control system is uniquely different in the manner in which the implementation takes place. Generally stated the system utilizes two trains of pulses for deriving the necessary timing information for giving the precision to the occurrence of the control signals that require precision timing.

Referring to FIG. 2, one train of pulses is derived from a high speed clock pulse generator 50 and the other from a pulse generator 52 which come at a slower rate. The first or higher speed clock may be derived from any suitable means and may be related to the drive speed of the machine main drive such as the motor M that drives the photoconductor belt 12. The slower speed pulse generator 52 may be derived from the timing pulse generator (FIG. 1, T) provided by the roller 19 or a suitable registering means that registers the arrival of the lead edge of the paper sheet at a point near the transfer roller 19.

While the pulse generating means 50 and 52 may be operatively associated with the machine drive means or the paper transfer roller, as described above, they need not be so limited or tied down, as shall be described in detail later. These two trains of pulses are applied to the logic matrix 53 of the timed logic section 42 via the shift register 49 and the counter 51 respectively, and the logic matrix 53, in response, generates the timed control signals. As will be explained in detail hereinafter the timed logic section 42 keeps track of the sheets and the images in progression in the paper and photoconductor paths respectively from the two trains of pulses and generates the timed control signals and sends them out to their corresponding process step implementing means in the output paths 91, 92, etc.

The high speed clock source 50 may be of any suitable design, such as, for example, a magnetic pickoff device that picks off the clock pulses from the predetermined number of gear teeth disposed at the periphery of a disc mounted axially on the drive shaft of the main drive motor M, as the shaft rotates. The clock pulse generator 50 may also be of a photodetecting arrangement of a suitable type that detects the chopped light by an apertured disc that may be mounted axially on the drive shaft of the main motor M as the shaft rotates. The clock pulses so derived is related to the speed of the motor M that controls the speed of the photoconductor belt 12.

But the clock generator 50 need not be coupled to the drive shaft of the motor. It can be from any suitable source, such as a regular 60 hertz power supply line or even an independent crystal oscillator. The important thing to note is that the clock pulses generated by the clock 50 are maintained in frequency at a given rate and are maintained in a certain fixed relationship to the speed of the photoconductor belt, that is, the speed at which the xerographic machine drive motor M rotates. The high speed clock pulses are applied to the counter 51. The counter 51 in turn counts and applies the count signal to the logic matrix 53.

The second clock source 52 may be derived from a suitable means which generates pulse signals, the timing of which can be used as a key, start, or bench mark of each of the imaging process cycles. It is important to note that the selected event is of such a nature that it can be used as a bench mark or a start of each of the imaging process cycles. Thus, the imaging step or image transferring step in the xerographic process can be used as the reset or start signal since they are keyed to the xerographic steps in terms of timing. Hence, more specifically, the registration of the lead edge of the paper sheet at a point just prior to or at the point of contact between the transfer roller 19 and photoconductor belt 12 may be used, because other xerographic processing steps in the photoconductor belt must be related back to this merging step.

In the alternative, the start or reset or registration pulses could be derived from the photoconductor belt 12 itself as follows: the photoconductor may be provided with a number of equally spaced apertures along an edge thereof to correspond to the spacing of successive images. A photodetecting means TD may be positioned at a suitable location to detect a light beam as it is chopped by the travelling belt 12. This signal may be used as a train of the reset or start signals. Or the reference or the reset pulse may be derived from the timing of the exposure pulses at the imaging stations. These reset or start pulses so generated by the pulse generating means 52 are applied to the shift register 49. Note that each of the pulses represents and corresponds to the successive images being formed and traversing through in the xerographic path.

Referring to the shift register, the first stage F1 of the process shift register is made a part of the asynchronous logic section 41 and is not clocked by the reset pulses. When the asynchronous control logic decides that the conditions are right and that the machine processing steps can be initiated, it generates and provides an enabling signal in the form of logical 1 to the shift register F1. This sets the shift register 49 in condition to respond to the reset pulses coming from the reset pulse generator 52. In response, the shift register 49 shifts the pulses down to the right in succession in the well known manner. The progression of a logical 1 along the shift register represents the progression or the movement of the leading edges of the images past certain points in the xerographic process. The shift register 49, in turn, provides logical signals to the logic matrix 53 signifying the procession of the images in the xerographic process path. The logic matrix is of a suitable design that derives, from the output of the high speed counter 51 and the shift register 49, precisely timed control signals in succession and applies them to the implementing means via the output paths 91, 92, etc.

It is noted here in passing that most of the working components, such as the asynchronous control section 41, the shift register 49, the counter 51 and the logic matrix 53 may be made of digital integrated circuit logic or large scale integrated circuits (LSI) presently available from any number of manufacturers. Use of such logic circuits offers decided advantages over the prior art mechanical or electromechanical or discrete logic elements from the standpoint of cost, reliability, versatility, power consumption, speed, size, etc.

The aforementioned control system will now be described from another viewpoint in order to highlight and focus on the timing/spatial relationship of the processing steps that recognizes and utilizes such a relationship in evolving a control system that is superior over the prior art control systems in terms of its reliability, flexibility, cost, etc., or more generally in terms of any usual criteria measuring the quality of such a system.

The relationship will now be described with reference to FIGS. 3 and 4. Referring to FIG. 3, there is shown the electrostatic or xerographic processing machine of FIG. 1, of most mechanical and other elements, but retaining the key elements which are necessary to show the xerographic or photoconductor and paper paths. FIG. 4 shows conceptual representation of the spatial and timing relationship of the xerographic path and paper path. It also gives a pictorial representation of clocks that illustrate the timing/spatial relationship.

In the xerographic process path, the photoconductor belt 12 is shown rotating counterclockwise at a uniform speed as it is driven by the motor M. The belt passes various processing stations, such as the exposure A, development B, transfer C, and charging 13 stations. The paper path is shown to include the paper feeding station 23, transfer station C and fusing station 24.

In analyzing the processing steps in the paper path and the xerographic path, the following characteristics are found: Certain steps such as the imaging, the image transferring and feeding of the paper at the transferring station are precisely timed. Also the monitoring steps such as the detection of the jam conditions along the paper path or detection of the undesired presence of the sheet on the selenium belt, SOS (FIG. 4) are precisely timed during the machine process.

However, there are other events or process steps which have to take place in a certain sequence but which do not require precise timing. Thus, the developing of the image at the imaging station B, the charging of the photoconductor belt at the charging station 13 and the feeding of the paper at the feeding station 23, etc., need not be as precisely timed as imaging, etc., though they must occur in a certain sequence.

Still another phenomenon observed in the processing system is that the movement of the paper in the paper path need not be at the same speed as that of the photoconductor belt 12, except at the point where image is transferred. Notice that in the paper path, the travel of the paper need not be maintained at a uniform speed as the papaer traverses its path. Thus, the paper may be brought up very speedily to the registration point. But at the registration point it must be fed into the transfer roller at the same rate as the rate at which the photoconductor belt travels. After the image transfer takes place and the paper leaves the roller, it may then travel at any other speed to the fusing station 24 and so on. What is critical is that at the transfer station, the paper travels synchronously with the traveling speed of the image on the photoconductor belt 12.

Figure 4:
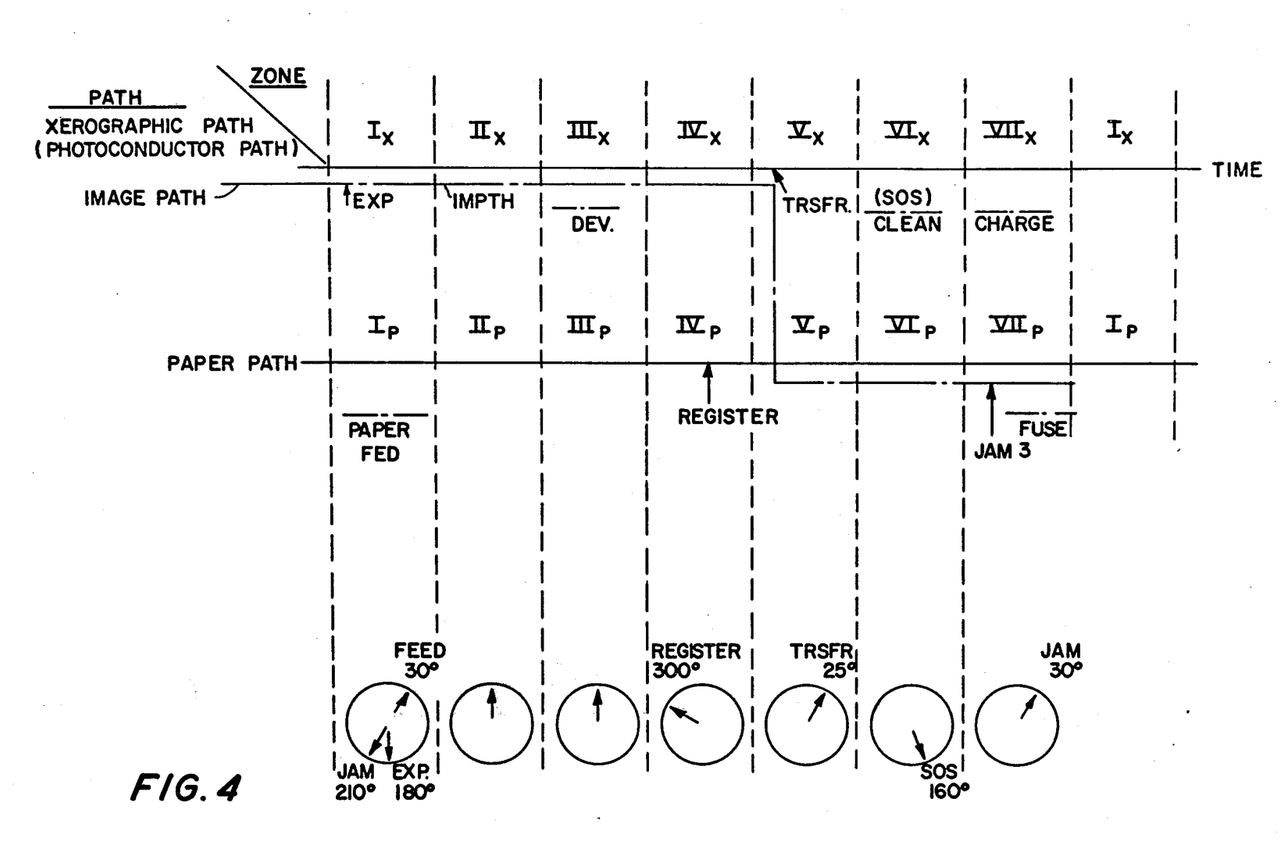
FIG. 4 shows graphic illustrations of various aspects of the principles involved in the control system according to the present invention.

FIG. 4 graphically represents the foregoing phenomena. Note that the xerographic path and paper path are subdivided into uniformly spaced sections or "pitches". The spatial sections relate to the timing of the images being processed. More specifically, for example, the xerographic path may be divided into a given number of zones, sections $I_x$ through $VII_x$. The paper path may be analogously divided into seven zones, or sections $I_p$ through $VII_p$.

In the xerographic path the physical distance traversed by the image across the successive zones are the same because the belt 12 travels at a constant speed. But the physical spacing in the paper path does not correspond to the speed with which paper travels because the paper travels at different speeds in different zones along its path. In FIG. 4, the actual spacings or distances between the zones in the paper path are in effect shrunk or stretched to correspond to the corresponding photoconductor belt path zones to show their timing relationship. Because of the uniformity involved, the physical spacing or zones in the photoconductor path are used as the reference path in the present control system.

Now note that within each of the zones or sections certain processing steps occur. Thus, referring to FIGS. 3 and 4, in the xerographic path, the exposure takes place at the zone $I_x$, the development takes place at the zone $III_x$, the cleaning takes place at the zone $VI_x$, and charging at zone $VII_x$. And, in the paper path, the paper is fed at the zone $I_p$, the paper is registered at the zone IV$_p$, the image is transferred at zone V$_p$, and the fusing takes place at zone VII$_p$.

Now in terms of timing relationship, note that certain of these events must take place at a particular point and space in time in these zones, as the images are formed and travel with the photoconductor path, transferred to the paper and then travels along the paper path, as noted by the path IMPTH. In terms of timing relationship, note that the events or steps taking place in these zones take place concurrently.

Now in order to highlight this relationship, clocking signals are graphically represented by clocks for each zone in FIG. 4. These clocks may be imagined as a series of clock which clocks the events happening in the respective zones. They are however, set to the same time standard. The hour hands of these seven clocks move synchronously, and they signify imaging cycles, and hence, their advances to succeeding hours signify new image processing cycles. So when the machine is fully loaded, seven imaging processes or seven copying processes occur in various stages concurrently at any given moment.

Now referring to each zone, specific events taking place within that zone may be analogized to the minute handle. For example, in zone I, the paper feed takes as the minute arm travels to about 30° angle in the paper path. Sometime later the image exposure takes place at the imaging station A in the xerographic process (or photoconductor) path. This takes place precisely (at a certain point in time) say, for example, as the minute arm travels past 180° position. Sometime later, for example, 35 minute position of 210° travel later, a jam sensing or detection operation takes place. Now, in zone IV concurrently with zone I, the registration of the paper takes place at the 25 minute or the 150° position whereas the image transfer takes place, say, at 10 minute position or 300° later. And so on, various events or steps take place concurrently in the seven zones shown.

Now note that sequence of events such as exposure, registration, image transfer, jam detection, and detection of the sheet on the selenium (SOS) take place at precisely timed positions and these steps are signified by the vertical arrows in FIG. 4. On the other hand, there are certain events such as development, cleaning, charging, paper feeding, fusing, etc., that need not be as precisely timed as the exposure or image transfer step and they are shown in broken horizontal lines.

The foregoing spatial and timing relationship is utilized in the present control system illustrated in FIG. 2. The control system shown in FIG. 2 will be described again. But this time in the context of the aforementioned systems spatial and timing relationship.

Referring to FIGS. 1 and 2, the reset pulses are derived from the transfer roller 19 or from the paper registration means as stated before. Note that spacing of the reset pulses correspond to the spatial zones in the photoconductor path wherein the registration or transfer points are shown in zone V.

Now in FIG. 2, the flip flops F1-F7 of the shift register 49 could be considered graduations, each representing a zone in FIG. 4 and analogous to foot markings in a ruler and the high speed pulses from the high speed clock pulse 50 may be analogized to the inch markings within each foot or zone in the ruler. Now on a ruler the inch marking restarts at zero as one progressed to the next foot; likewise, the high speed counter which corresponds to the inch markings is reset to zero each time the lower speed counter or the shift register shifts one flip flop or section to the right corresponding to the movement of the image from one zone to the next. To determine where the location of a point on the ruler is, one looks at the foot section and the inch markings. Analogously, the logic matrix 53 looks at the shift register 49 and the counter 51 to derive similar information, i.e., the gross timing, in terms of zone information from the ON/OFF condition of particular flip flop and refined timing from the pulse from the counter 51 within the corresponding zone.

So, to determine where an image leading edge is along the belt path, one looks at the shift register and determines which zone it is and looks at the output of the counter 51 which corresponds to the precise positioning of the leading edge.

Another way of perceiving the control system from the point of view of the spatial and timing relationship may be as follows. The xerographic process path and the paper process path are divided into pitches, each pitch corresponding to an image spacing or zone indicated above. Each pitch on the photoconductor belt 12 is at least as wide as the image one wishes to form. Now each zone or each shift register is therefore analogous and corresponds to each pitch whereas the count outputs from the high speed counter 51 is analogous to a "residue" within each pitch. So events or steps take place in each zone as the image or the paper traverses that zone or pitch. This precession or progression is signified by the shifting down of the flip flops F1-F7 in response to the reset pulses from the counter 51.

It is important to note that the pulses from the clock 50 and 52 represent positions of the images that are being processed in the zones of the belt concurrently, as the belt with electrostatic images on it moves past these zones. But the positions of processing stations such as the imaging station A, development station B and the transfer station C, etc. themselves do not move any more than the markings on an unmoving ruler move. The point is that the images move past the ruler not the ruler past the points. The individual shift registers represent the pitch lengths around the belt path and the content of the individual shift registers signifies the presence or absence of the lead edge of an image in that zone.

It should be noted that both clocks are distance or space dependent and not real time dependent. Since the motor driving the photoconductor belt 12 can vary somewhat in speed, there may not be any direct relationship between these clocks and the drive speed representing the real time. These clocks are also directly related to the travel of the images in the paper path after the transfer. In the paper path, the paper travels at different speeds in different zones but path is divided so the paper takes the same amount of time in traversing each zone.

The logic matrix 53 compares the conditions of the shift register output and the clock output 51. When the shift register and the clock output indicate that the leading edge of an image has arrived at a point where a timed event or step must take place such as flash image respectively transfer or register, etc., the logic matrix generates a timed control signal therefor. The matrix senses this fact and sends out a pulse for implementing that step. This takes place for each image. So up to seven images represented by these seven flip flops F1-F7 are monitored and timed signals are sent out for each of the seven zones or images concurrently.

There are functions that need to come only within the accuracy of pitches such as cleaning, charging and the fusing operations. These control functions may be timed by just looking at the shift register and checking whether they are turned on and off. These functions remain on ON during the steady state operation of the machine. On the other hand, the operations controlled by the logic matrix 53 are of such a nature that they are turned on and off at particular points in time in the processing pitch during the steady state operations of the machine as well as the cycle on and off operations.

The control scheme used in the present control system can be very advantageously used to detect jam conditions by tracing where the leading edge of any sheet of paper should be at any particular time. The control system can monitor or check leading edges of sheets traveling through the paper path and thereby check jam conditions.

Figure 3:
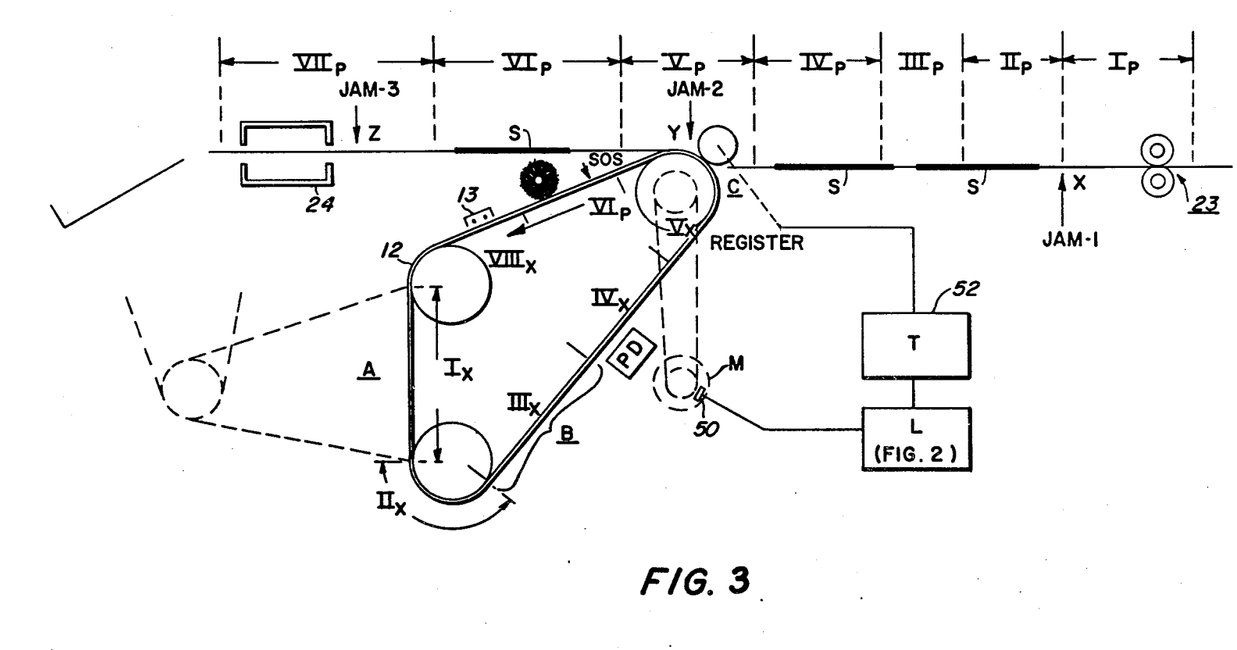
FIG. 3 shows a schematic sectional view similar to the one shown in FIG. 1 simplified to illustrate control principles of the present invention.

Referring to FIG. 3 a certain point X in the paper path may be checked to sense whether or not the paper has been fed. The point Y in the path may be checked to test mispuff or the failure of the paper from coming off of the transfer roller 19, and the point Z just prior to the fusing station, may be checked also. The logic matrix derives the jam condition signal when it checks at these points and fails to detect the presence of the lead edge of the paper itself at these positions. Thus, what the control logic 42 does is that it checks that there is no paper present just before the sheet should arrive at a location and then checks to see that the sheet has arrived when it should. If either of these conditions are not satisfied, then the matrix applies a jam signal to the machine. The machine, in turn, may be "hard" stopped or cycled out depending upon the position and timing of the jam signal. If the jam occurs before the paper reaches the fuser, the main machine is made to stop immediately and held to a standby condition to prevent the paper from being fed into the fuser and cause a fire hazard. On the other hand, if the jam signifies that the paper is still in the fuser, then the machine is made to cycle out that paper from the fuser before it is stopped and held to a standby condition.

In operation, as apparent from the foregoing description, the controller system monitors and senses various sets of inputs, certain of which are used by the asynchronous logic section in generating signals that are necessary to initialize and start the machine, run the machine with the help of the output of the timed control signals from the synchronous logic section and put the machine into the shut down cycle when appropriate. Thus, the control system is designed so that the processing paths are treated as if they comprise a given number of sections or zones and key timing of the control signals to the imaging cycles on the revolving photoconductor belt, in terms of spatial and timing relationship described above. The control system is designed so that when the machine is loaded fully with a given number of images for example, seven images, it monitors simultaneously all the images in progression at various stages in various zones or pitches; the synchronous control logic section looks at each of the zones concurrently and generates timed control signals for use in each zone or for each imaging cycle in progression in each zone. Thus, when the processing machine is fully loaded the timed control logic section derives the timed control signals for the various zones concurrently, where the timing of the control signals in each zone is in effect timed by separate clocks, while all of the clocks are held to the same time standard. Thus, referring to FIG. 4, for example, during a particular pitch or imaging cycle the timed control logic section generates the following sequence of timed control signals all in one pitch time interval or imaging cycle; transfer control signal in zone V for transferring the image to a corresponding sheet at the transfer station C, paper feed signal in zone I in the paper path and jam sense signal in the zone VII in the paper path, and the sensing signal for the sheet on selenium in zone VI, the exposure signal forming the image in zone V on the photoconductor belt, and jam detect signal in the paper path in zone I, and so forth. Note here that an imaging cycle is merely intended to mean a cyclical time interval that corresponds to a time period for a lead edge of the image to traverse a particular zone.

Another phenomenon observed is that while the pitch intervals are fixed by the reset or start pulses and are keyed to the imaging cycle on the photoconductor belt, the high speed pulse train need not be precisely keyed. Thus, for example, the high speed pulses may be 1,000 pulses±a given number, say 5 or 10 pulses per pitch interval, that is all of the pitch intervals need not be precisely divided equally. What is more important is that the count clock starts at the beginning of each pitch and that the high speed counter and the logic matrix counts these pulses and at particular counts the time control drive signals. The number of pulses within each pitch time interval depends upon the degree of resolution with which one wishes to obtain in giving the precision to the timing of the control signals.

Figure 5:
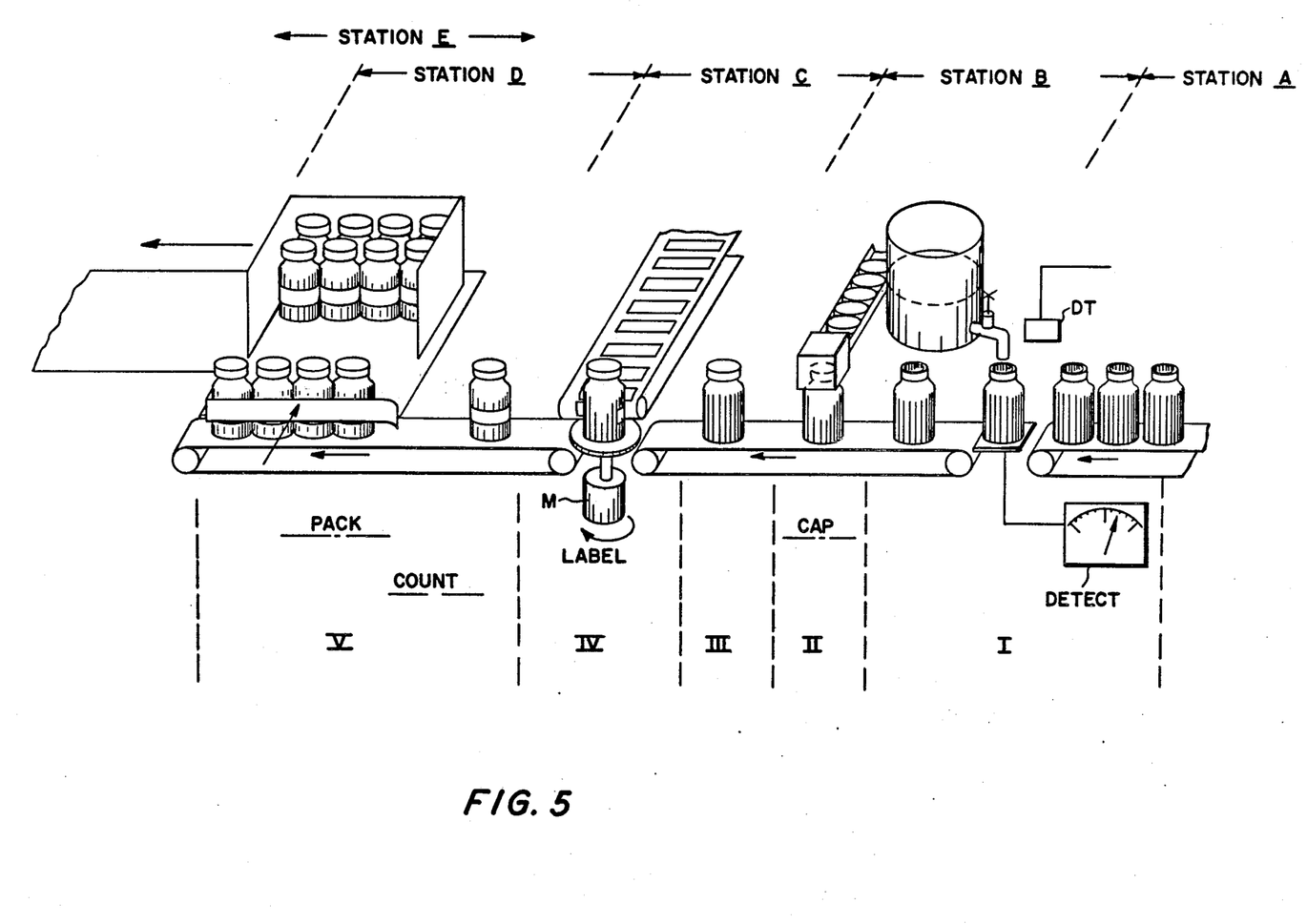
FIG. 5 shows a schematic illustration of a bottling process in which the control system of the present invention may be utilized as illustrative of the broad scope of applicability of the present invention.

While the control system according to the present invention has been described in the context of the electrostatographic copying machine and copying processes above with reference to FIGS. 1 through 4, clearly the nature of the Applicants' control system is such that it is not limited in terms of its applicability, to controlling the copying machine processes. It may very well be applied to any other type of processes that entail the controlling of the process steps and events within a process with a process. Thus, as represented in FIG. 5, a bottling process involving filling of bottles, labeling them, counting the labeled bottles and then putting a predetermined number of bottles in successive containers may also be controlled by the Applicants' control system with some modifications. Looking at FIG. 5 more closely, the bottling processes may be for bottling high priced perfumes or liquors. Suppose it is bottling of high priced precious perfume and it is important to measure out or dispense very precise amounts into each bottle, cap them and label them precisely with fancy multi-colored labels, count them and package them into packages each say 12 each in boxes. This may entail steps of advancing bottles, in succession, to the dispensing station A where the precise amount of perfume is measured and put into the bottles and then capping them at the station B, labeling them at station C, counting and packing them at stations D and E.

While the FIG. 5 shows schematically that the bottles in process are conveyed by a conveyor belt, it need not be so limited obviously. It could very well be that these bottles are transported along peripheral locations of one or more turret type conveying means where the movement of the bottles are maintained at uniform speeds at the respective conveying means.

Referring to FIG. 5 closely, the bottles are, however, not always in motion. At the working stations either they may be held in a stationary position for a given period of time as is the case when the bottles are filled at the station A and capped at the station B in succession they may be rotated about their axis in succession while held urgently against a planar surface holding the labels fed by a suitable means, feeding the labels in succession one at a time to coincide with the arrival of the bottles in succession. At this station when the bottle arrives, the label for that bottle is held at a stationary position and the bottle is gripped and rotated against the label clockwise as shown so that the label is wrapped around the bottle. The labels may be pre-gummed so that when the bottle is rotated therearound, they will adhere to the bottle. Note that at the labeling station a number of timed events take place that must be properly sequenced and accurately timed.

The foregoing bottling process involves the following general phenomena. Some of the process steps have to be precisely timed whereas other steps need be timed only grossly. For example, the filling of the bottles requires precise measurement; this may be done by precisely timing the start and stop of filling operation and controlling the flow rate of the liquid. Likewise, the labeling operation where the labels have to be brought in succession and each label has to be stopped for a precise duration while another mechanism holds and rotates the bottle against the labels. Some of the events or steps need not be timed as precisely. Thus, for example, the counting and packing at stations D and E need not be precisely timed.

Realizing the foregoing, one may divide the entire process path into a given number of zones or pitches, for example, five, as illustrated in FIG. 4. So looking at the five zones or pitches, what is taking place is that at zone I, the arrival of the bottle is detected and then the bottle is placed at the filling station A and the filling is started at a precise time and is stopped at a precise given time interval later. At zone I, the bottle is filled and at zone II the bottle is capped, and at zone III the bottle is labeled where the precise timing of a sequence of steps are required as stated before. At zone or pitch V, the bottles are counted four at a time and pushed forward in sets into a waiting box and when three sets are placed, the filled box is moved out of the way.

Now referring to an application of the Applicants' control system, the events or steps such as capping and counting of the bottles may be grossly timed by the shift register 49 output. Various precisely timed control steps required in labeling and measuring steps require further precision within each pitch. For this the high speed count output and the pitch count are used by the logic matrix to generate precisely timed control signals.

For registration or reset pulses that register the occurrence of the bottling cycle, a detecting means DT that detects the movement of the bottle entering the filling station may be used. For high resolution timing, any suitable clock may be used within any number of clock pulses per each pitch interval the number of clock or pulses being dependent entirely on the precision or resolution with which one wishes to control these timed events. The logic matrix 53 is adapted to provide in response to the reset and clock count signals pulses, output signals which are precisely timed to control these precisely timed process steps such as certain steps required in the measuring and the labeling stations.

In summary, the present invention is directed to a control system where a process system may comprise one or more process paths, the input components parts are processed through the paths and merged in producing final products, and some of the process needs to be timed in a gross sense while others must be precisely timed in any one or more of the process paths. In controlling these events or processing steps, the present control system provides one train of pulses set to provide pitch signals that correspond to gross timing and that represent subdivisions processing paths into zones or pitches where events or steps occur concurrently in various stages of progression and another train of pulses the frequency of which is related to the resolution or accuracy with which the timing of the certain events or process events in the various zones or pitches must be precisely timed and controlled. Mode of a set of flip flops are used for deriving the "pitch" information and a high speed counter and a logic matrix are used to respond to the two pulse trains and derive the precisely timed control signals.

While the invention has been described primarily in terms of an electrostatographic copying process and then briefly in terms of its applicability to a bottling process, the present invention is broadly applicable to many different machine processing systems. Therefore, other modifications or changes may be made by a person of ordinary skill without departing from the spirit and scope of the principles of the invention described above.

We claim:

1. A method of controlling an electrostatographic reproducing system for producing copies on copy sheets, a path for said copy sheets, an imaging path, a plurality of actuable stations positioned along said copy sheet and imaging paths for processing said copies including stations for forming and developing latent electrostatic images of an original in succession on a photoreceptor means driven along said imaging path, and transferring the developed images onto the copy sheets traversing along said copy sheet path in succession, wherein said system is designed to make copies at a given rate and wherein said imaging and copy sheet paths are divisible into zones so spaced that the images and copy sheets in transit traverse corresponding zones at said given rate, said method including the steps of:

generating a first train of pulses, the repetition rate of which corresponds to the rate at which the copies are made, generating a second train of pulses, the repetition rate of which is substantially higher than that of said first train of pulses, deriving timed first control signals from said first and second train of pulses for repetitively actuating selected ones of said plurality of actuable stations in various ones of said zones in time sequence in successive pulse periods of said first train of pulses, and generating second control signals for actuating the remainder of said stations asynchronously for making copies in succession.

* * * * *